United States Patent [19]

Yamada

[11] Patent Number: 5,035,397

[45] Date of Patent: Jul. 30, 1991

[54] ENGINE MOUNT APPARATUS

[75] Inventor: Taiji Yamada, Hamamatsu, Japan

[73] Assignee: Suzuki Jidosha Kogyo Kabushika Kaisha, Shizuoka, Japan

[21] Appl. No.: 394,756

[22] Filed: Aug. 16, 1989

[30] Foreign Application Priority Data

| Aug. 26, 1988 | [JP] | Japan | 63-211985 |
| Aug. 26, 1988 | [JP] | Japan | 63-211986 |
| Aug. 30, 1988 | [JP] | Japan | 63-215977 |

[51] Int. Cl.⁵ .............................................. F16M 3/00
[52] U.S. Cl. ................................. 248/638; 180/297; 248/674
[58] Field of Search ............... 248/638, 637, 635, 659, 248/674, 675; 180/297, 292

[56] References Cited

U.S. PATENT DOCUMENTS

| 4,153,226 | 5/1979 | Kakac et al. | 248/659 |
| 4,456,213 | 6/1984 | Fukushima et al. | 248/659 X |
| 4,494,723 | 1/1985 | Kobuki et al. | 248/659 X |
| 4,537,381 | 8/1985 | Arai | 248/659 X |
| 4,625,939 | 12/1986 | Bergelt | 248/638 |
| 4,770,398 | 9/1988 | Lee | 248/659 X |
| 4,884,779 | 12/1989 | Drabing et al. | 248/638 X |
| 4,901,814 | 2/1990 | von Broock et al. | 180/297 |

Primary Examiner—Ramon O. Ramirez
Attorney, Agent, or Firm—Laubscher, Presta & Laubscher

[57] ABSTRACT

Disclosed is an engine mount apparatus for mounting an engine on the chassis of a vehicle. An engine mount body adapted to be fixed to the chassis is provided with stud bolts extending vertically downwardly thereof. A bracket having through holes corresponding to the stud bolts disposed on the engine to be mounted is secured to the engine at a predetermined position thereof. To mount the engine on the chassis, the engine is lifted up from below the chassis, the stud bolts are inserted through the through holes, the engine mount body and the bracket are fitted with each other and secured by means of nuts.

8 Claims, 8 Drawing Sheets

ENGINE MOUNT APPARATUS

BACKGROUND OF THE INVENTION

The present invention relates to an engine mount apparatus for mounting an engine on the chassis of an automobile.

Generally, in the process of mounting an automobile engine, (in this specification, the mounting of an engine means mounting on a chassis an engine as a single unit or a power train incorporating an engine, a transmission, etc.), the engine is lifted up to a specific height from below a chassis, and in this state the chassis and the engine are coupled with each other via a plurality of mount bodies.

Conventionally, the mounting of an engine is carried out by attaching mount bodies 2 at specified positions of an engine 1 and coupling the mount bodies 2 with a chassis 3 by the use of bolts or the like that are tightened from various directions.

Figure 10:
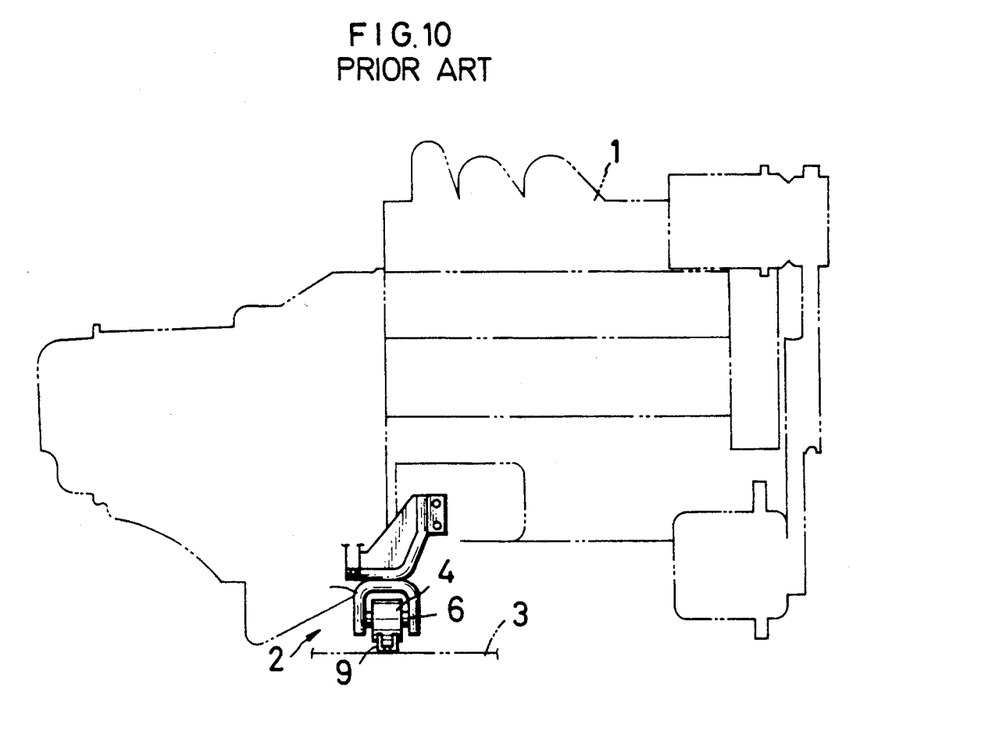
Figure 11:
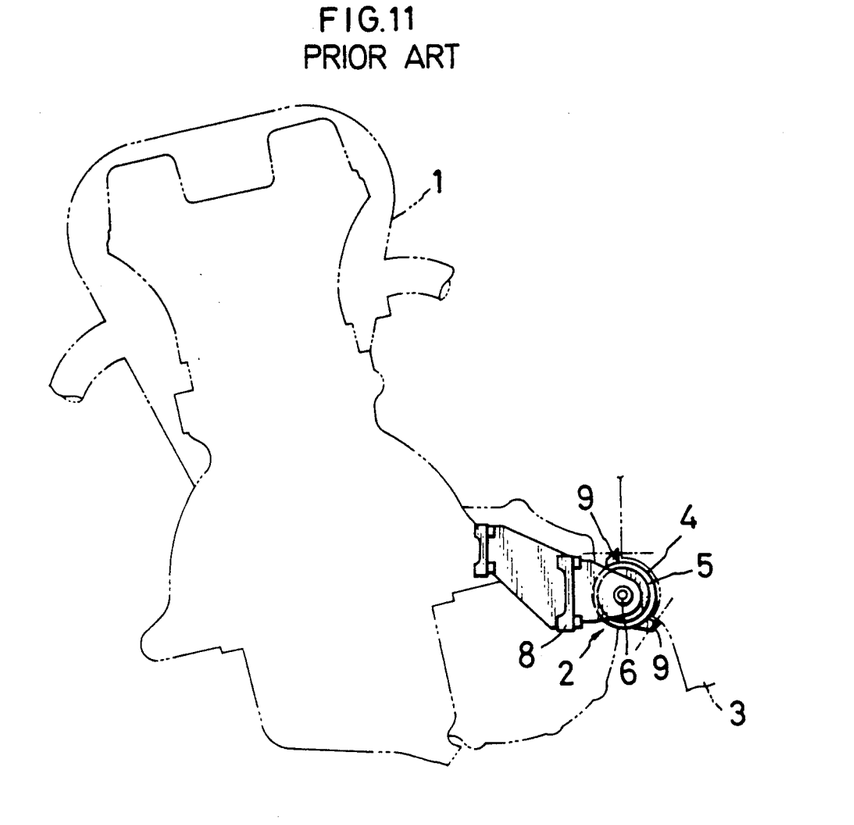

Although the structure of an engine mount apparatus and a method of attaching the same to a chassis vary depending on the position of installation and the difference in the structure of the engine itself, there is a case where a portion of the engine 1 on the rear-side of the chassis 3 is supported by the chassis 3, as shown in FIG. 10 and 11. The engine mount 2 used for this portion is arranged such that a rubber material 5 is fitted inside a casing 4 and a shaft 6 is inserted into the rubber material 5 so as to form the mount body 2, and then the shaft 6 of the mount body 2 is fixed to the engine 1 by bolting or the like via a bracket 8. Then, an arm 9 fixed to an outer peripheral surface of the casing 4 is secured to the chassis 3 by bolting or the like.

Figure 12:
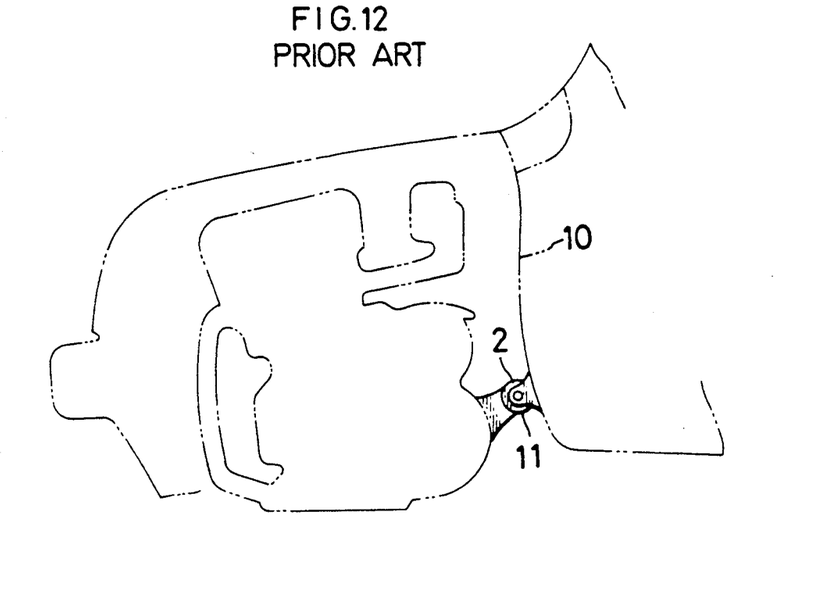

Furthermore, depending on a type of automobile, there is a case where the engine mount body 2 is fixed to a dash panel 10, and this dash panel 10 is used to support the engine 1 (FIG. 12).

Conventionally in such a case, as shown in FIG. 12, a bracket 11 having a projecting distal end is formed by sheet metal processing, a proximal portion of this bracket 11 is welded to the dash panel 10, and a distal end thereof is coupled with the mount body 2 or an unillustrated engine mount bracket.

With the above-described conventional engine mount apparatus, however, the bolting work has to be carried out in a horizontal direction in view of the relationship in configuration between the mounting portions on the engine 1 side and the chassis 3 side. Therefore, there has been a problem in that the operation of fixing the mount body 2 to the chassis 3 is made extremely difficult. This is because the operator must carry out the positioning of the mount body 2, fixed in advance to the engine 1 side, with respect to the chassis 3 within the limited space of the engine room between the engine 1 and the chassis 3.

Furthermore, if a bracket is used, since it is formed of sheet metal and has a structure in which a projecting distal end projects, there has been a drawback in that the bracket is weak in terms of its mechanical strength and is not only disadvantageous in terms of the mechanical strength of the chassis but also liable to cause the vibrations of the engine to be transmitted to the compartment of the automobile. Furthermore, there has been an additional problem in that the work efficiency is poor since the bracket must be fixed to the mount body 2 in the horizontal direction.

SUMMARY OF THE INVENTION

Accordingly, an object of the present invention is to provide an engine mount apparatus which can facilitate the positioning of the three members, an engine, a mount body, and a chassis so as to improve the assembling efficiency and which has a high installation strength, thereby overcoming the above-described drawbacks of the conventional art.

To this end, according to the present invention, there is provided an engine mount apparatus for mounting an engine on a chassis of a vehicle, comprising: an engine mount body fixedly disposed in a predetermined position of a chassis and having a stud bolt suspended therefrom; a bracket having a through hole for fitting with the stud bolt and adapted to be secured to the engine; and a nut for being threadingly engaged with the stud bolt inserted through the through hole; whereby the engine is lifted up vertically, the engine mount body and the bracket are fitted with each other, and the nut is then tightened, thereby mounting the engine on the chassis.

In accordance with another aspect of the invention, the engine mount body includes an auxiliary bracket supported via a resilient member such as rubber, and the stud bolt extends vertically downwardly of the auxiliary bracket.

In accordance with still another aspect of the invention, the engine mount apparatus comprises an engine mount body including a bracket having a stud bolt suspended therefrom and another bracket attached to the engine side via a resilient member and having a through hole for receiving the stud bolt.

The above and other objects, features and advantages of the present invention will become more apparent from the following description of the invention when read in conjunction with the accompanying drawings.

BRIEF DESCRIPTION OF THE DRAWINGS

FIGS. 9 to 12 illustrate a prior art, in which FIGS. 9, 11 and 12 are side elevational views thereof; and FIG. 10 is a top plan view thereof.

DETAILED DESCRIPTION OF THE PREFERRED EMBODIMENTS

Referring now to the accompanying drawings, a detailed description will be given of the embodiments of the present invention. In the drawings, common parts are denoted by the same reference numerals.

In FIGS. 1 to 4, which illustrate a first embodiment of the present invention, an engine (power train) 1 is supported by a chassis 3 by means of three mount bodies 2. The three mount bodies 2 are respectively arranged to support a left-hand portion, a right-hand portion, and a rear-end portion of the engine 1 on members of the chassis 3. Although the manner of supporting and fixing the engine 1 by means of the mount bodies 2 varies respectively, installing portions of the engine 1 are uniformly provided with a pair of stud bolts 20 extending downwardly. On the other hand, brackets 22 are fixed to the left-hand portion, right-hand portion, and rear-end portion of the engine 1 at appropriate positions by bolting. In addition, a pair of vertically extending through holes 21 are formed in each bracket 22.

Figure 1:
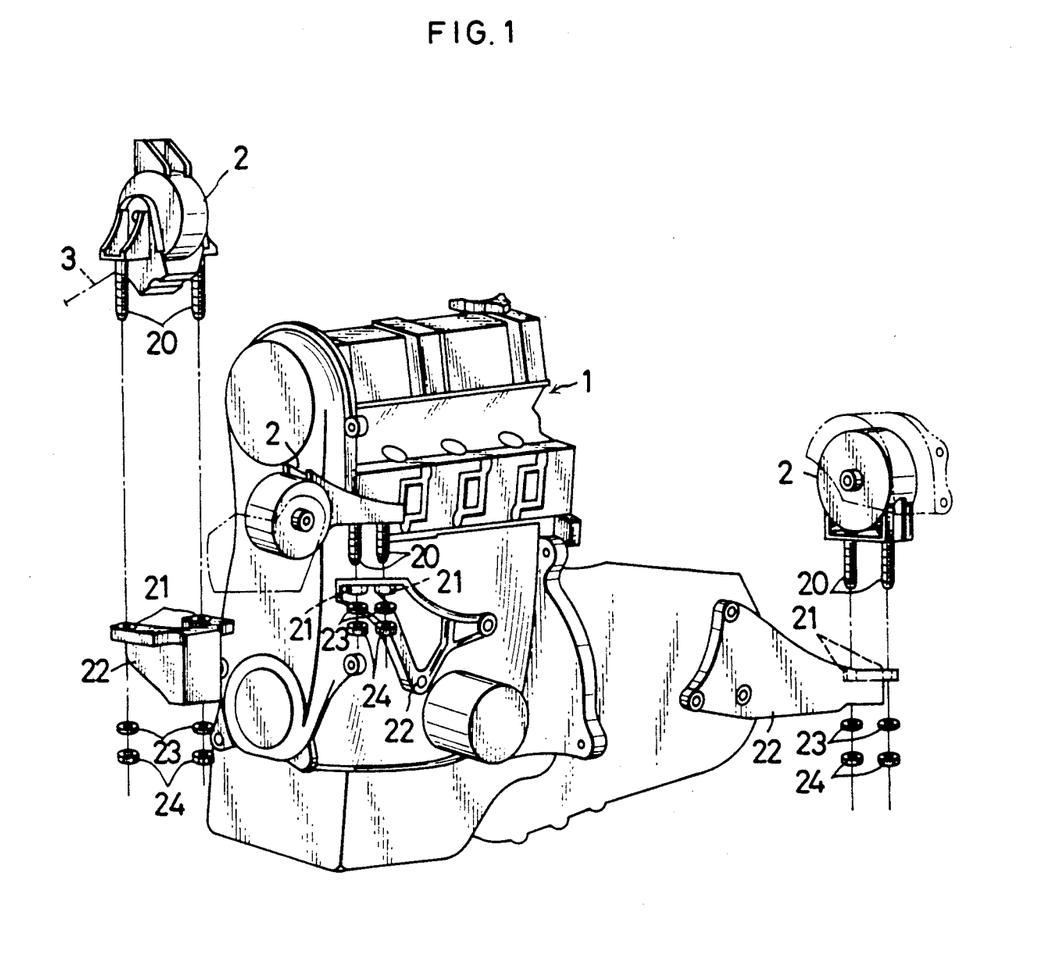
FIG. 1 is an exploded perspective view of an engine mount apparatus in accordance with a first embodiment of the invention.
Figure 2:
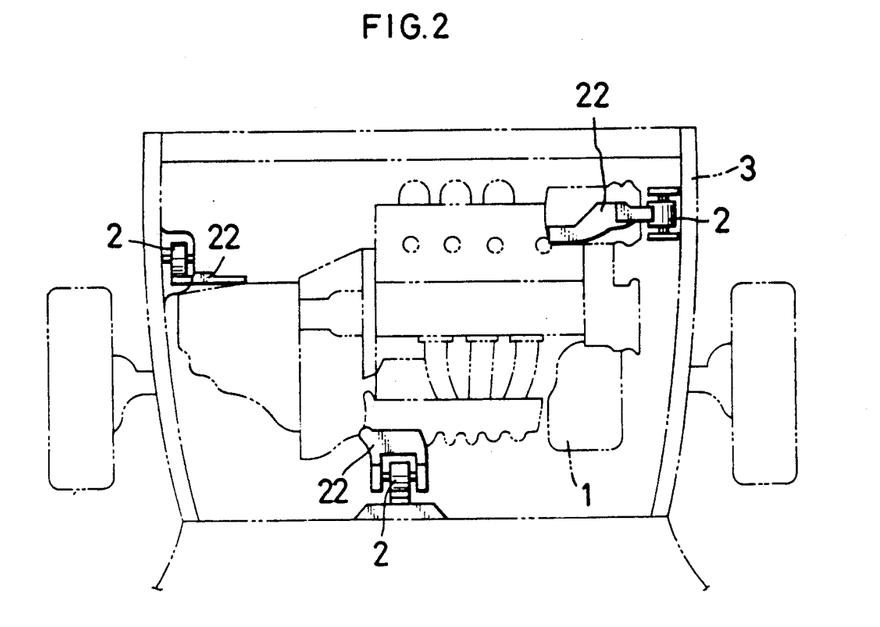
FIG. 2 is a top plan view thereof.
Figure 3:
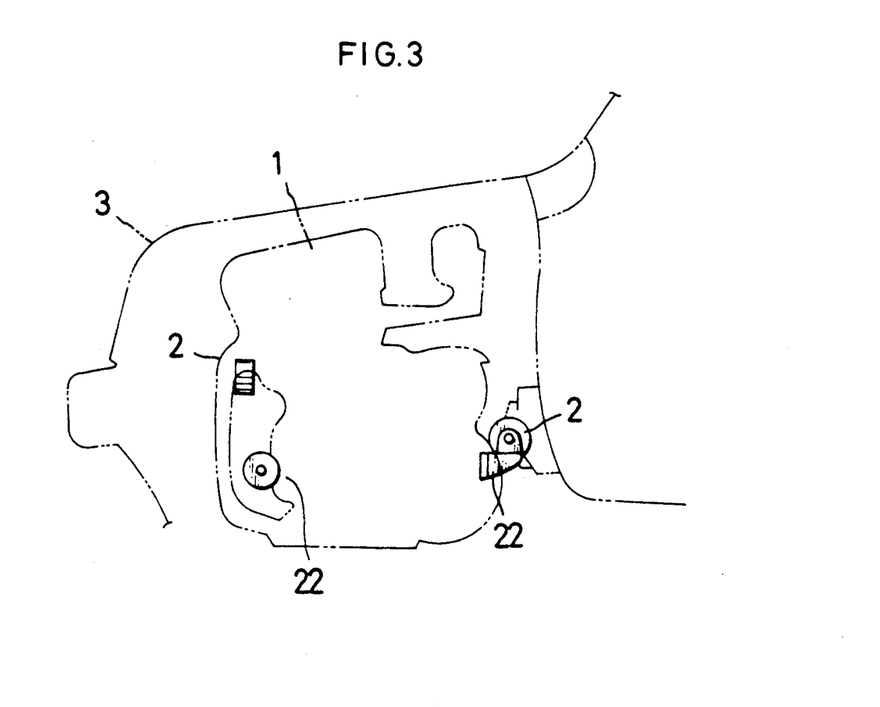
FIG. 3 is a side elevational view thereof.
Figure 4:
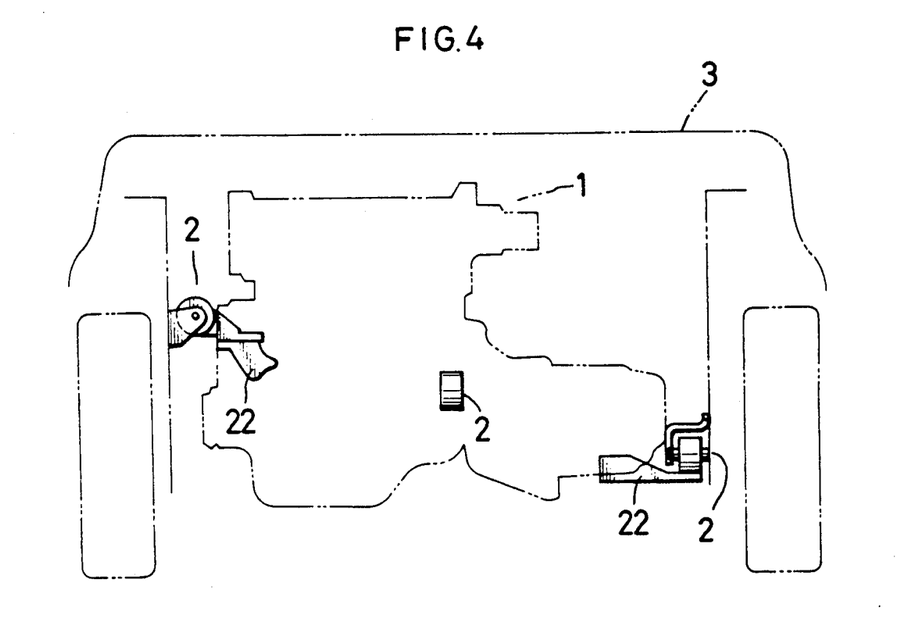
FIG. 4 is a front elevational view thereof.

In FIG. 1, reference numeral 23 denotes a washer, while numeral 24 denotes a nut.

In the above-described arrangement, the mounting of the engine 1 on the chassis 3 is effected as follows:

First, the mount bodies 2 are fixed to the chassis 3, and the brackets 22 are fixed to the engine 1. In this state, the engine 1 is lifted up from below the chassis 3, and the stud bolts 20 projecting downwardly from the chassis 3 are inserted into the respective through holes 21 of the brackets 22 on the engine 1 side. At this time, the stud bolts 20 serve as guide pins, and when all the stud bolts 20 are inserted into the through holes 21, the engine 1 are positioned accurately relative to the chassis 3. Subsequently, the washer 23 and the nut 24 are fitted to the end of each stud bolt 20, and the nut 24 is tightened from below the chassis 3. As a result, the mount bodies 2 and the brackets 22 are tightened together and secured, and the engine 1 is thus mounted accurately on the chassis 3 via the mount bodies 2.

As described above, in accordance with this embodiment, if the engine is lifted up from below the chassis, and the stud bolts on the chassis side are inserted into the through holes of the engine-side members, the engine can be positioned accurately on the chassis with the mount apparatus interposed therebetween. Accordingly, the trouble of relative positioning of the members can be dispensed with, and the mounting efficiency can hence be improved substantially. In addition, since all the operation of tightening the bolts and nuts can be performed from below the chassis, the mounting efficiency can be improved in this respect as well.

Figure 5:
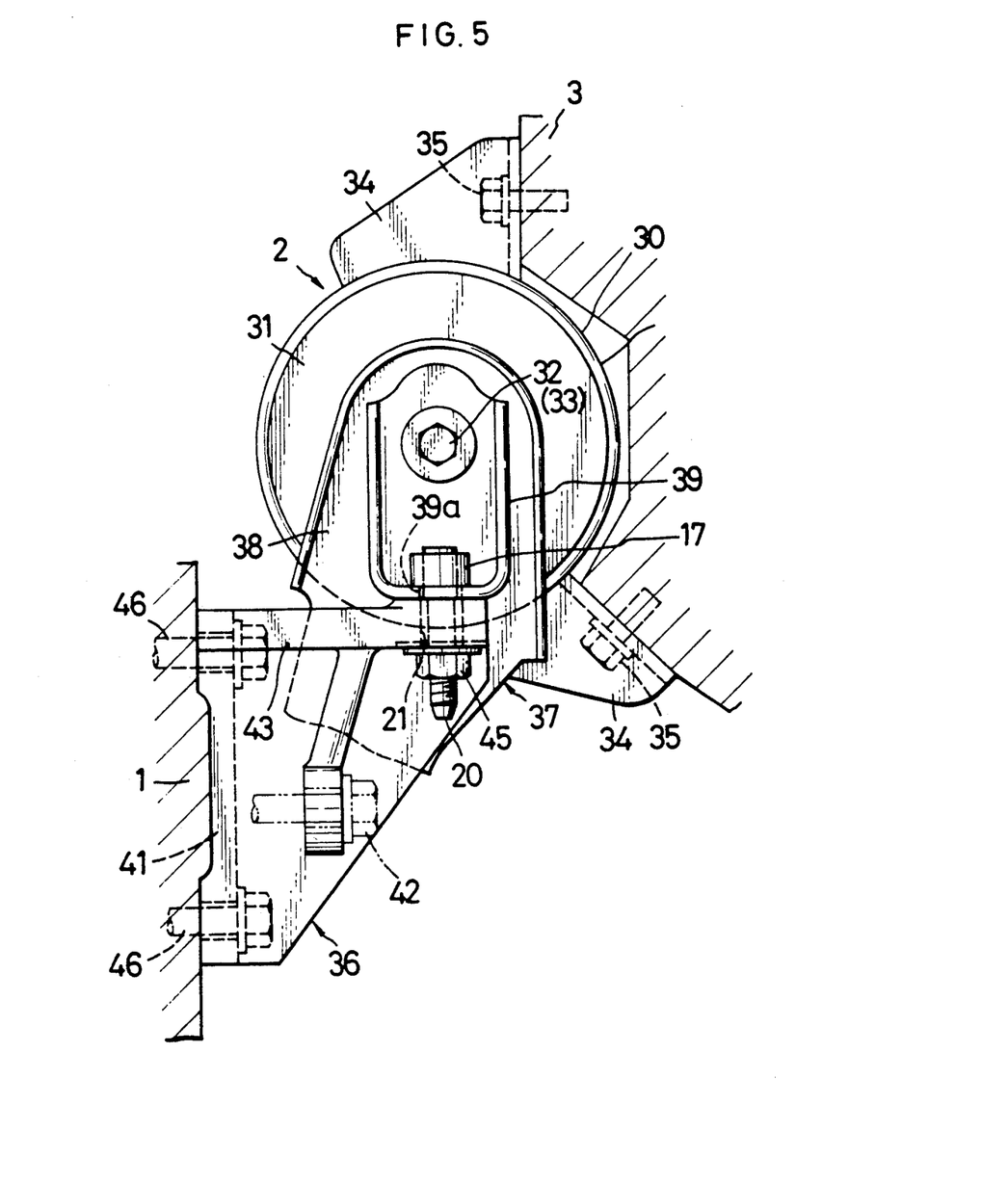
FIG. 5 is a side elevational view of an engine mount apparatus in accordance with a second embodiment of the invention.
Figure 6:
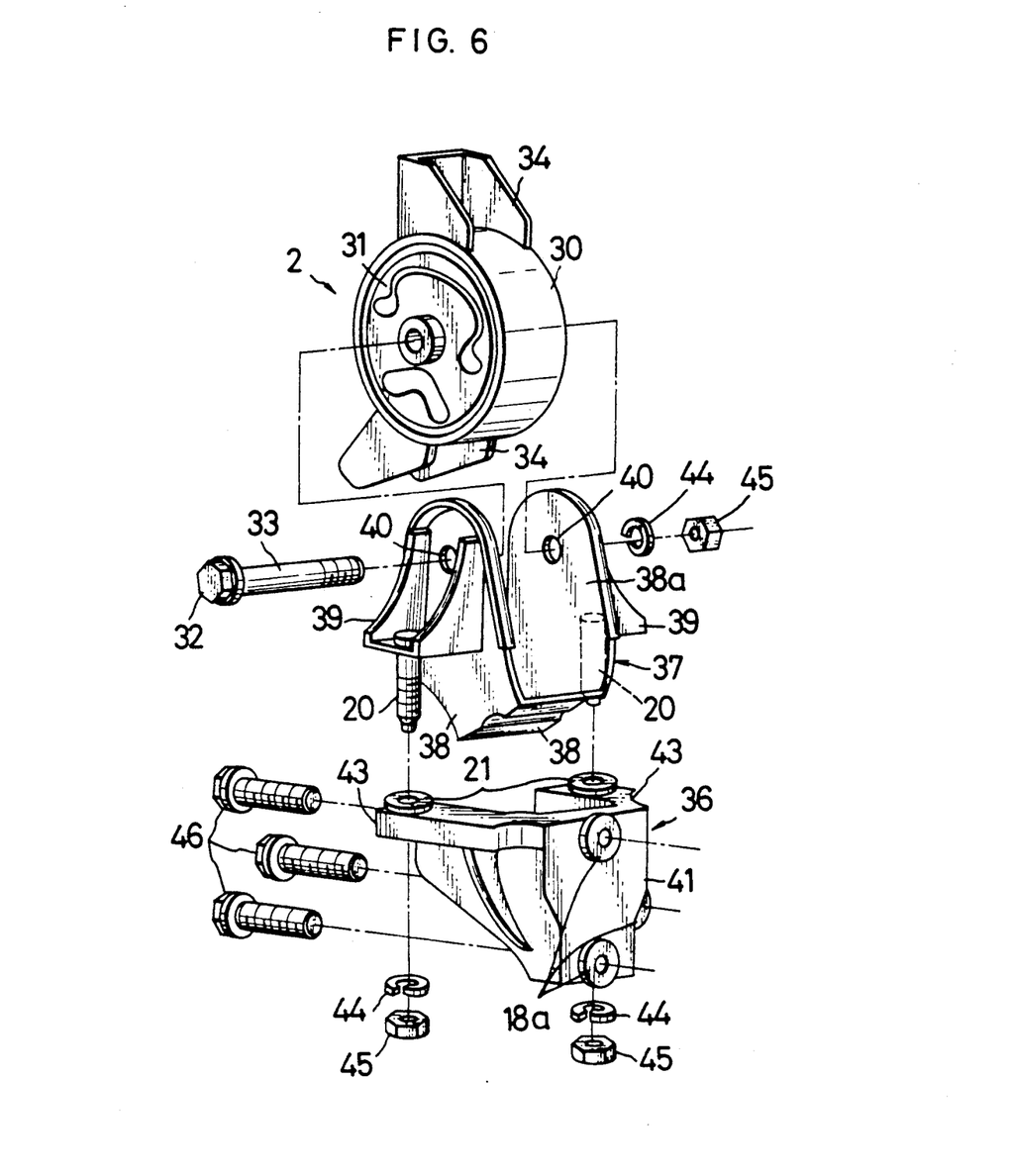
FIG. 6 is an exploded perspective view thereof.

Next, a description will be given of a second embodiment of the invention with reference to FIGS. 5 and 6.

The mount body 2 is arranged such that a rubber material 31 is fitted inside a casing 30 and a shaft 33 of a bolt 32 is inserted loosely in the center of this rubber material 31. A pair of arms 34 are formed on an outer peripheral portion of the casing 30, and the arms 34 are adapted to be attached to the chassis 3 by means of bolts 35. The bolt 32 inserted loosely in the rubber material 31 is supported by a bracket 36, which will be described later, on the engine 1 side. Accordingly, the mount body 2 absorbs the vibrations imparted to the shaft 33 and the casing 30 by means of the rubber material 31.

An auxiliary bracket 37 has a pair of lugs 39 respectively welded to outer surfaces of opposite side walls 38a of a baseplate 38 formed with a substantially U-shaped section. Each lug 39 is provided with a bore 39a, a nut 40 being secured concentrically in the bore 39a. A distal end portion of the stud bolt 20 inserted through the bore 39a is threadingly secured to the nut 45. In addition, bores 40 for allowing the shaft 33 of the bolt 32 to be loosely inserted therethrough are respectively provided at predetermined positions of the opposite side walls 38a of the baseplate 38 and the lugs 39 abutting the same.

Meanwhile, the bracket 36 is provided with a plurality of bores 41a formed in a proximal portion 41 thereof, a bolt 46 being adapted to be inserted into each of these bores 41a and bolted to the engine 1. In addition, a pair of U-shaped flanges 43 are formed at an upper end of the proximal portion 41, and are each provided with a through hole 21 for allowing a distal end portion of the stud bolt 20 to be inserted therethrough.

In the drawings, reference numeral 44 denotes a washer, while numeral 45 denotes a nut.

The engine mount apparatus thus arranged is assembled to the engine 1 and the chassis 3 as follows.

First, the mount body 2 is interposed between the side walls 38a of the auxiliary bracket 37, and the shaft 33 of the bolt 32 is inserted through the side walls 38a and the mount body 2. In this state, the nut 45 is threadingly secured to the distal end of the bolt 32 via the washer 44. The distal end portion of the stud bolt 20 is threadingly secured to each lug 39 of the auxiliary bracket 37, and each arm 34 of the mount body 2 is secured to the chassis 3 by means of the bolt 35. At this juncture, the stud bolts 20 attached to the bracket 37 extend downwardly. The bracket 36 is secured to the engine 1 at a predetermined position thereof by means of bolts 46.

Subsequently, in this state, the engine 1 is lifted up from below the chassis 3, and the distal end portion of each stud bolt 20 supported by the chassis 3 is inserted through the through hole 21 of the bracket 36 fixed to the engine 1. At this juncture, the portion of the auxiliary bracket 37 which is located below the lugs 39 is inserted between the pair of flanges 43 extending laterally thereof in a U-shaped configuration. When the lower surfaces of the lugs 39 and the upper surfaces of the flanges 43 are brought into contact with each other, the washer 44 and the nut 45 are attached to the distal end portion of each stud bolt 20, and the nut is tightened from below the chassis 3. When the tightening of the nuts 45 is completed, the assembling of the engine mount apparatus in accordance with this embodiment is completed.

Figures 7, 8:
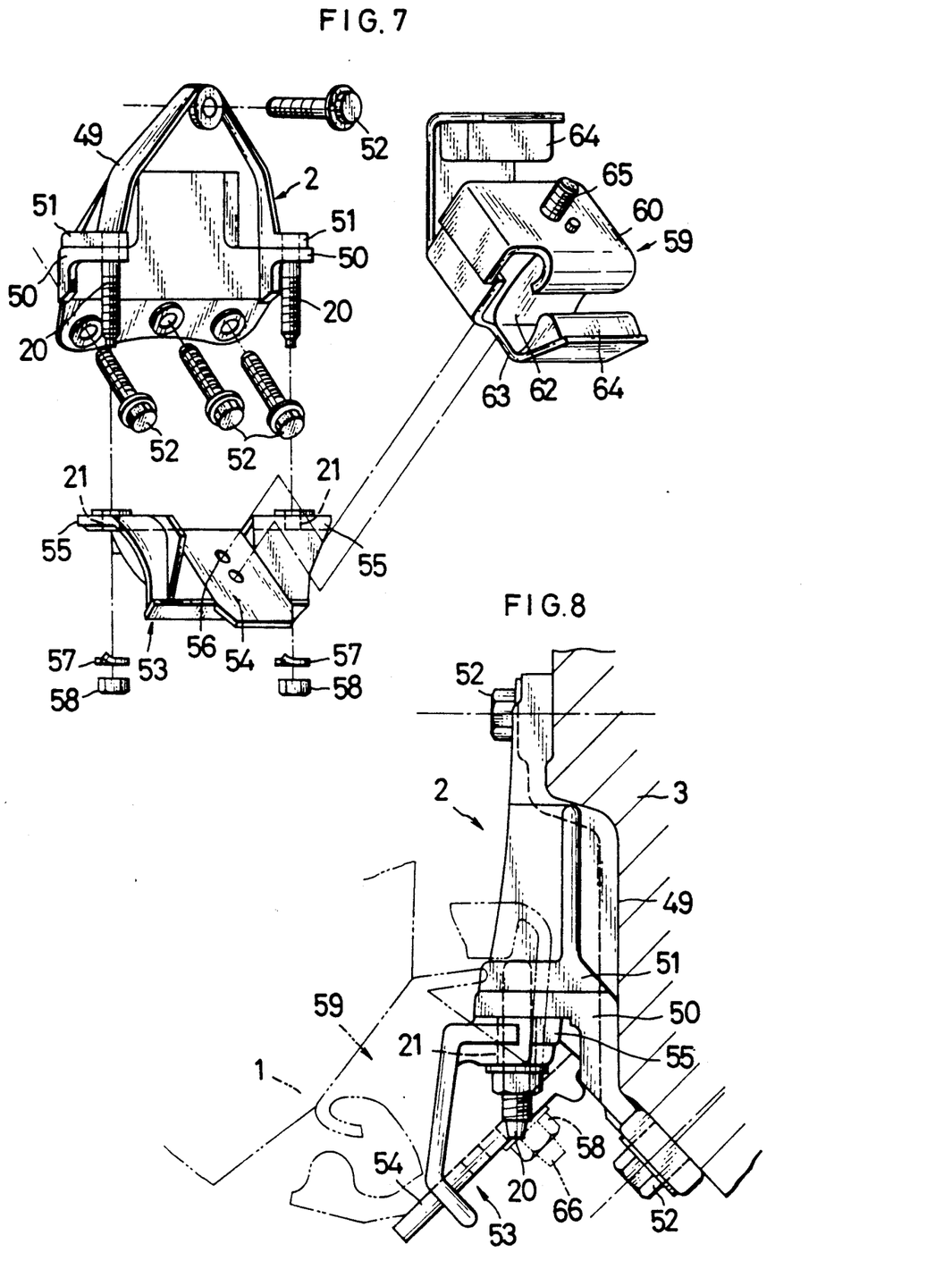
FIG. 7 is an exploded perspective view of an engine mount apparatus in accordance with a third embodiment of the present invention.
FIG. 8 is a side elevational view thereof.
Figure 9:
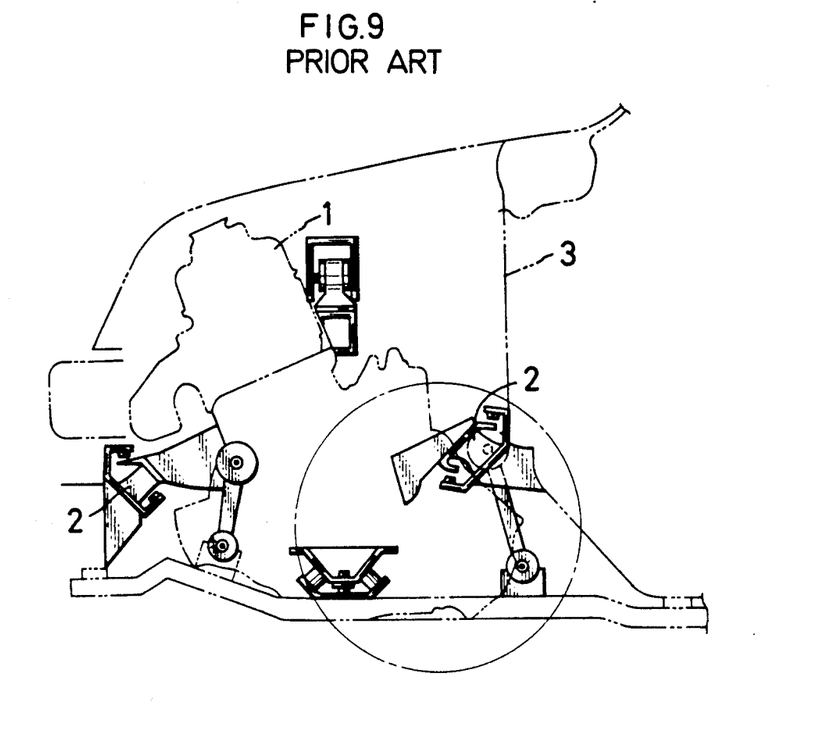

Referring now to FIGS. 7 and 8, a description will be given of a third embodiment of the present invention. In this embodiment, the rubber material for resiliently holding the engine is provided not on the (engine) mount body but on a second bracket which is attached to the engine.

The mount body 2 formed into the shape of a bracket is arranged such that its rear side constitutes an attaching surface 49 to be attached to the chassis (dash panel) 3, and is formed into a configuration conforming with the configuration of bent attaching portion of the chassis 3. A pair of U-shaped flanges 50 are formed on the front side of the mount body 2, each flange 50 being provided with a boss 51. The proximal portion of the stud bolt is threadingly secured to each boss 51. In addition, the upper and lower end portions of the mount body 2 are respectively threadingly secured to the chassis 3 by means of bolts 52.

Furthermore, a pair of flanges 55 are formed integrally at the upper ends of opposite side portions of an attaching surface 54 to be attached to a resiliently holding member 59. The attaching surface 54 and the flanges 55 are arranged in such a manner that when the flanges 55 are maintained in a horizontal posture, the attaching surface 54 is inclined diagonally downward at a predetermined angle. The attaching surface 54 is provided with a pair of through holes 56 for allowing bolts 66 of the resiliently holding member 59 to be inserted therethrough, while the pair of flanges 55 are each provided with the through hole 21 for allowing the distal end of the stud bolt 20 to be inserted therethrough.

In the drawings, reference numerals 57 and 58 respectively denote a washer and a nut that are attached to the distal end of the stud bolt 20.

In this embodiment, a sheared type is adopted as the resiliently holding member 59 and is arranged such that a rubber material 62 is interposed between an upper attaching member 60 and a lower attaching member 63, and a stopper rubber 64 for restricting a large displacement of the rubber material 62 is provided on opposite side portions of the lower attaching member 63. The upper attaching member 60 is attached to the engine 1 via a bolt 65, while the lower attaching member 63 is attached to the aforementioned bracket 53 via a bolt 66.

In the above-described arrangement, the engine 1 can be supported by the chassis 3 as follows.

First, the proximal portion of each stud bolt 20 is attached to the mount body 2, and the mount body 2 is secured to the chassis 3 by means of the bolts 52. As a result, the distal end portions of the stud bolts 20 face downward, and the attaching surface 49 is brought into contact with the chassis 3. Meanwhile, the bracket 53 is secured to the resiliently holding member 59 by means of the bolts 66, and the holding member 59 is secured to the rear-end portion of the engine 1. The through holes 21 of the bracket 53 face vertically.

Subsequently, in this state, the engine 1 is lifted up from below the chassis 3, and the distal end portions of the stud bolts 20 are inserted through the through holes 21 of the bracket 53. At this juncture, the washer 57 and the nut 58 are attached to the distal end of each stud bolt projecting downward from the through hole 21, and the nuts 58 are tightened from below the chassis 3.

Thus, at the time of mounting an engine, it is possible to easily position the mount body and the bracket with the stud bolts serving as guides, and the operation of tightening the mount body and the bracket can be performed from below the chassis. Accordingly, the work efficiency can be improved substantially. Furthermore, since the side attaching portion can be reinforced by the attaching surface of the mount body formed by casting, the vibrations of the engine that are imparted to the chassis can be suppressed to a lower level than the conventional arrangement.

What is claimed is:

1. An engine mount apparatus for mounting an engine on a chassis of a vehicle, comprising:

an engine mount body fixedly disposed in a predetermined position on the chassis and having a stud bolt mounted thereon and extending substantially vertically downwardly therefrom;

a bracket having an upwardly facing through hole for receiving said stud bolt therethrough, said bracket being secured to said engine; and a nut threadingly engaged with said stud bolt inserted through said through hole;

whereby in the mounting of said engine it is lifted up vertically, said engine mounted body and said bracket are fitted with each other so that said stud bolt extends through said through hole, and said nut is then tightened on said stud bolt from beneath said chassis, thereby mounting said engine on said chassis;

said engine mount body comprising an auxiliary bracket having said stud bolt thereon and being threadingly engaged with a shaft penetrating a resilient member, and a supporting member of said resilient member being secured to said chassis.

2. An engine mount apparatus according to claim 1, wherein said engine mount body has a plurality of stud bolts mounted thereon in substantially parallel relation, and said bracket has a plurality of through holes for receiving said stud bolts therethrough.

3. An engine mount apparatus according to claim 1, wherein said bracket is attached to said engine via a resilient holding member.

4. An engine mount apparatus according to claim 1, wherein an attaching surface of said engine mount body for attachment to said chassis is formed in conformity with the configuration of an attaching portion of said chassis.

5. An engine mount apparatus according to claim 1, wherein said engine mount body is a metal casting.

6. An engine mount apparatus according to claim 1, wherein said bracket is a metal casting.

7. An engine mount apparatus according to claim 1, wherein said resilient member is a circular rubber member accommodated in a circular supporting member.

8. An engine mount apparatus according to claim 3, wherein said resilient holding member is of a sheared type.

* * * * *